US008881191B2

(12) United States Patent
Magdy et al.

(10) Patent No.: US 8,881,191 B2
(45) Date of Patent: Nov. 4, 2014

(54) PERSONALIZED EVENT NOTIFICATION USING REAL-TIME VIDEO ANALYSIS

(75) Inventors: Walid Magdy, Giza (EG); Motaz El-Saban, Giza (EG)

(73) Assignee: Microsoft Corporation, Redmond, WA (US)

(*) Notice: Subject to any disclaimer, the term of this patent is extended or adjusted under 35 U.S.C. 154(b) by 454 days.

(21) Appl. No.: 12/059,618

(22) Filed: Mar. 31, 2008

(65) Prior Publication Data

US 2009/0249387 A1  Oct. 1, 2009

(51) Int. Cl.
*H04H 60/65* (2008.01)
*H04H 60/48* (2008.01)
*G06F 17/30* (2006.01)

(52) U.S. Cl.
CPC ............ *H04H 60/48* (2013.01); *H04H 60/65* (2013.01); *G06F 17/30787* (2013.01); *G06F 17/30831* (2013.01)
USPC .............. 725/32; 725/43; 725/52; 382/181; 348/460

(58) Field of Classification Search
USPC .......................................... 725/32
See application file for complete search history.

(56) References Cited

U.S. PATENT DOCUMENTS

| 6,061,056 | A  | * | 5/2000 | Menard et al. | 715/704 |
| 6,593,976 | B1 | * | 7/2003 | Lord | 348/731 |
| 2005/0108747 | A1 | * | 5/2005 | Omoigui | 725/32 |
| 2006/0195859 | A1 | * | 8/2006 | Konig et al. | 725/19 |

OTHER PUBLICATIONS

Stefan Eickeler, Stefan Miller. Content-Based Video Indexing of TV Broadcast News Using Hidden Markov Models. 1999 IEEE.*
Simone Stumpf et al. Toward Harnessing User Feedback for Machine Learning. Oregon State University 2006.*
Baillie, Mark & Joemon M. Jose. Audio-Based Event Detection for Sports Video. CIVR 2003, LNCS 2728, pp. 300-309, 2003.*

* cited by examiner

*Primary Examiner* — Bennett Ingvoldstad
(74) *Attorney, Agent, or Firm* — Steve Wight; Judy Yee; Micky Minhas

(57) ABSTRACT

A system and methods for personalized event notification using real-time video analysis are described. In an embodiment, a live video feed is automatically monitored and characteristics of the video feed are analyzed against criteria which relate to an event which has been identified by a user. The criteria relate to characteristics of the image or the audio in the video feed. If the criteria are satisfied, the user is notified that the event has occurred and this notification may be achieved through messages on the video display screen (e.g. on the television screen) or other messaging techniques (e.g. SMS or email). In an example, the criteria may define a particular logo and the user is notified if the analysis detects the logo in the video feed.

20 Claims, 12 Drawing Sheets

PERSONALIZED EVENT NOTIFICATION USING REAL-TIME VIDEO ANALYSIS

BACKGROUND

The number of television channels which are available to a viewer has increased considerably with the advent of satellite television, cable television and digital terrestrial television. As a result it is hard for a viewer to select a channel to watch and there may be circumstances where a viewer, or group of viewers such as a family, wants to watch more than one channel. One solution to this is for the viewer to manually switch between the channels; however this is inefficient and may be ineffective, particularly in the case of unpredictable events such as goals in a soccer match, where the viewer may miss the interesting event by switching at the wrong time. Another solution, which enables a viewer to watch more than one television channel at the same time, is picture in picture (PIP) technology. PIP, however, is limited in the number of channels which can be displayed simultaneously and is also visually distracting.

Event notification systems have been developed which use RSS (Rich Site Summary or Really Simple Syndication) feeds, SMS (short message service) messages or email to notify subscribers to breaking news, sporting results etc. In these systems, the notifications are triggered manually by a news agency or other service provider.

The embodiments described below are not limited to implementations which solve any or all of the disadvantages of known event notification systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A system and methods for personalized event notification using real-time video analysis are described. In an embodiment, a live video feed is automatically monitored and characteristics of the video feed are analyzed against criteria which relate to an event which has been identified by a user. The criteria relate to characteristics of the image or the audio in the video feed. If the criteria are satisfied, the user is notified that the event has occurred and this notification may be achieved through messages on the video display screen (e.g. on the television screen) or other messaging techniques (e.g. SMS or email). In an example, the criteria may define a particular logo and the user is notified if the analysis detects the logo in the video feed.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
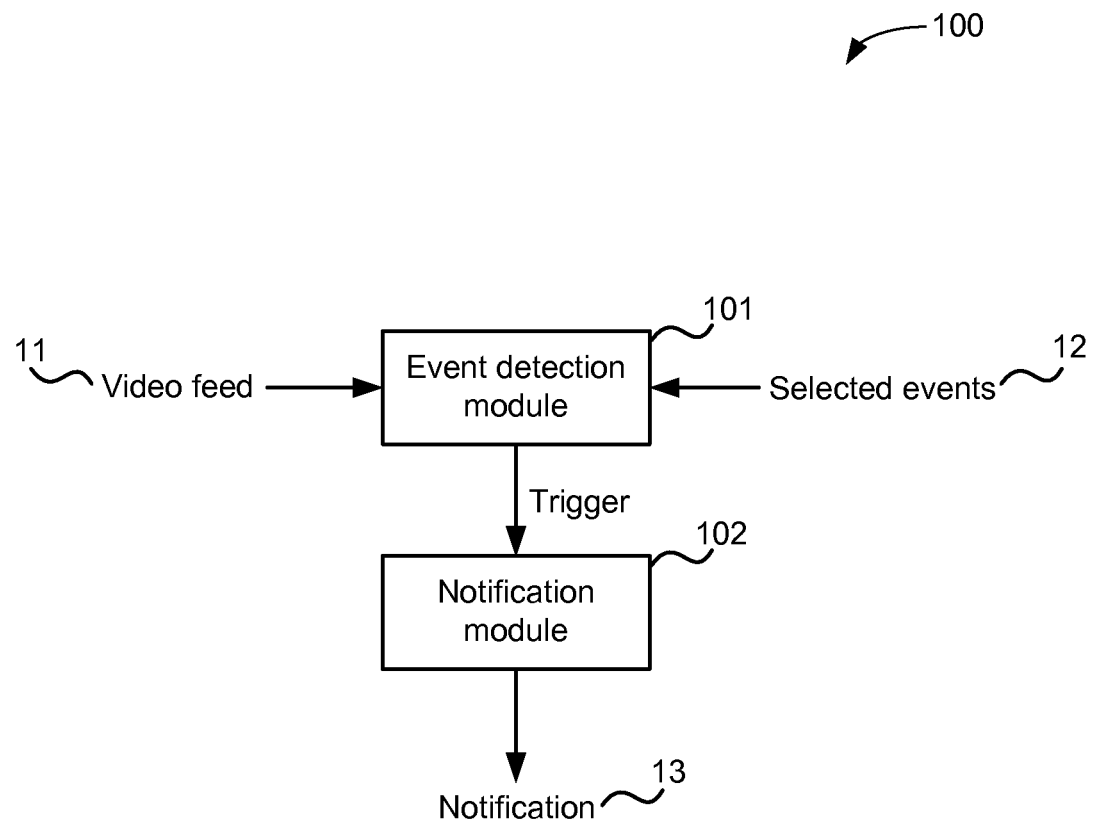
FIG. 1 is a schematic diagram of an automated event notification system.
Figure 2:
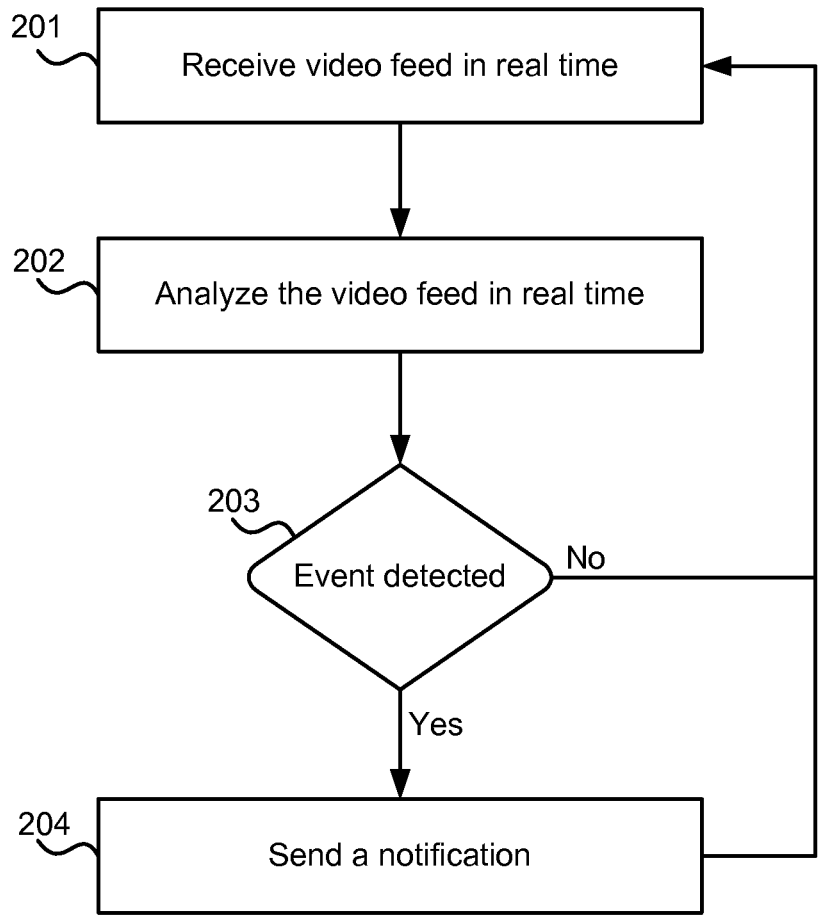
FIG. 2 shows a flow diagram of an example method of personalized event notification.

FIG. 1 is a schematic diagram of an automated event notification system 100. The system 100 comprises an event detection module 101 and a notification module 102. The operation of this system 100 can be described with reference to FIG. 2, which is a flow diagram of an example method of event notification. The event detection module 101 receives a video feed 11 in real-time (block 201). The video feed, which may, for example, comprise one or more television channels, is analyzed in real-time by the event detection module 101 (in block 202) and if one of a set of predefined events 12 (e.g. breaking news or a goal being scored) is detected ('Yes' in block 203), the notification module 102 sends a notification 13 (block 103). The method is repeated so that the video feed is analyzed periodically or substantially continuously.

The event notification system 100 monitors the video feed and provides a user with personalized notifications of particular events, which the user may have previously identified or selected. The analysis of the video feed to detect events (in block 202) may use a number of different techniques (e.g. pattern matching) and may be based on image characteristics, audio characteristics, temporal characteristics or any combination of characteristics of the video feed. The notification may be provided (in block 204) in a number of different ways (e.g. by an on screen message or SMS message) and the user may be able to configure the type of notification required for all events or for particular events. Embodiments of the system and method are described in more detail below and although the many of the examples described below refer to the video feed being one or more broadcast television channels, this is by way of example only.

Figure 3:
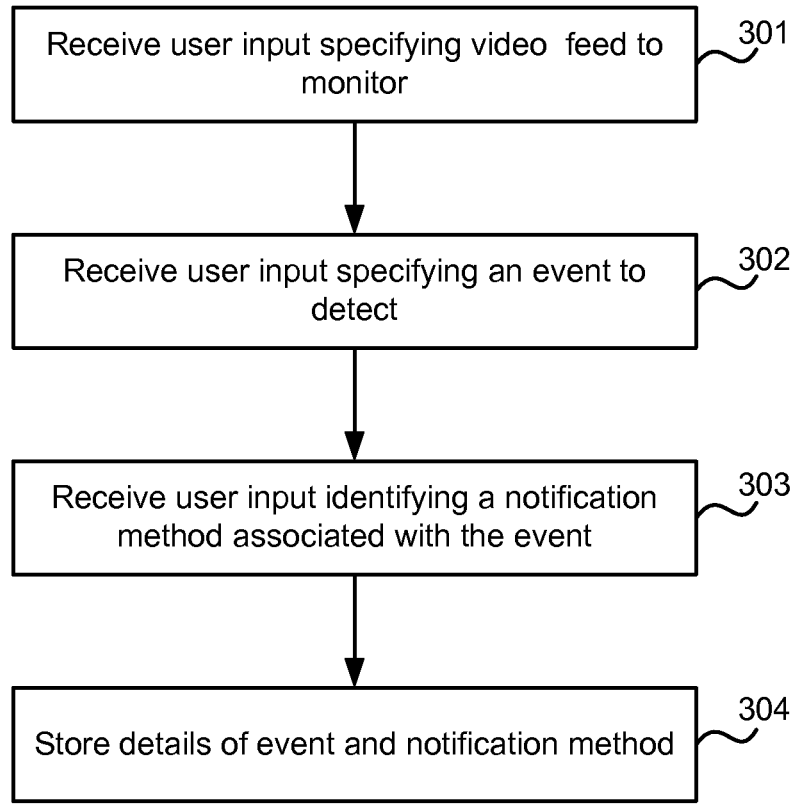
FIG. 3 shows a flow diagram of an example method of setting an event notification in an event notification system.

The video feed 11, which is input to the event detection module 101, may be broadcast television, a streamed video accessed over the internet (e.g. as downloaded from a video sharing website) or any other video feed. The video feed may be referred to as a live video feed. The term 'live' is used to refer to the fact that the feed is received and analyzed in real-time, i.e. as it is broadcast or streamed, rather than pre-processing the video before it is streamed or broadcast. The term 'live' is not intended to limit the video feed to broadcast of live events and the live video feed may include pre-recorded material (e.g. television broadcasts which are not live, videos previously recorded and uploaded to web servers etc). Where the live feed is broadcast television this may include video on demand services (e.g. premium film services provided by satellite or cable television operators). The video feed 11 which is monitored may be specified by a user (block 301), as shown in FIG. 3, which is a flow diagram of an example method of setting an event notification in a system such as shown in FIG. 1. For example, a user may specify which television channels or which computer user's streamed video should be monitored.

Figure 4:
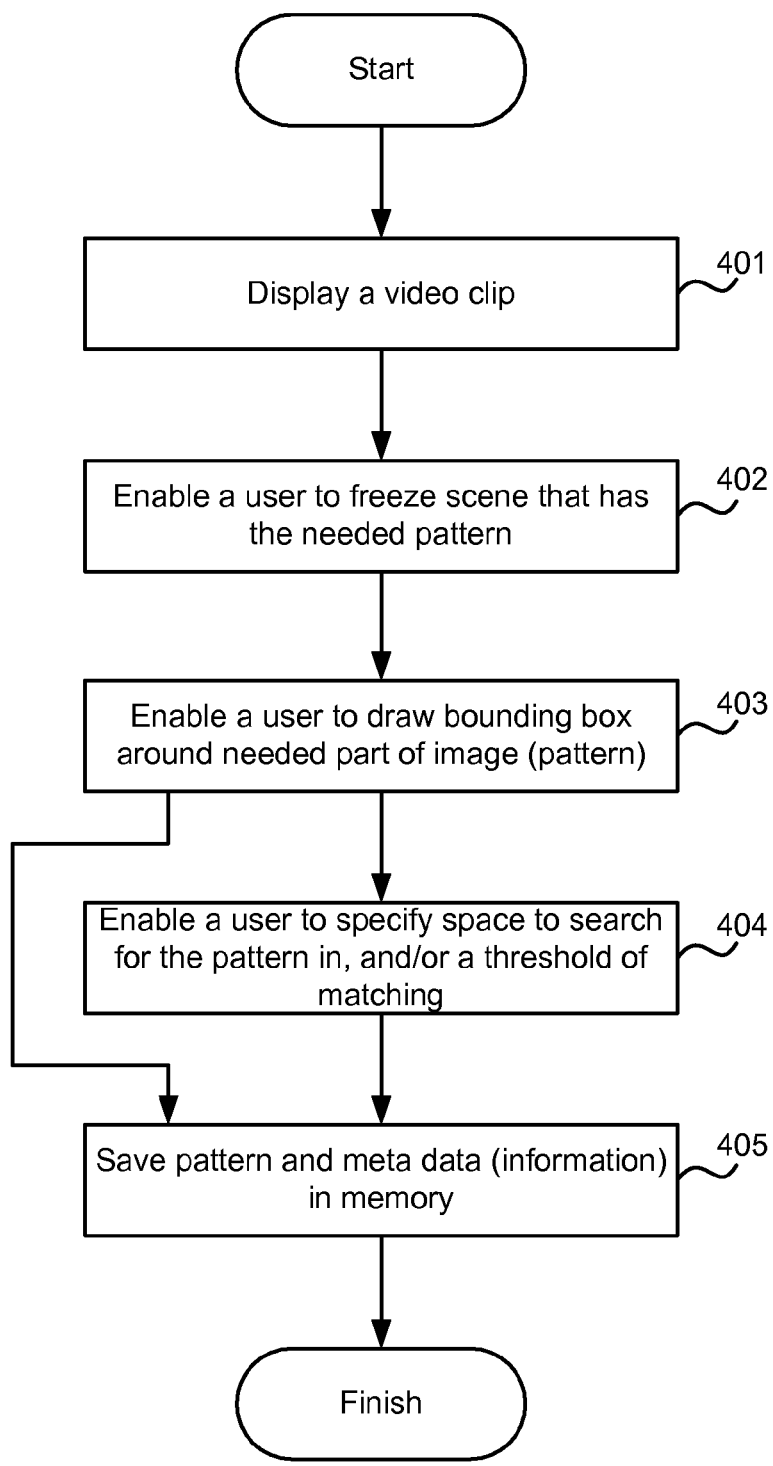
FIG. 4 shows a flow diagram of an example method by which a user specifies an event to detect in terms of an image pattern.

The predefined events 12 may be specified by the system 100, by a user (e.g. as shown in FIG. 3 block 302 or FIG. 4), by a television broadcaster, by an advertiser or by any other entity. In an example, the events may be selected by a user (in block 302) from a set of possible events listed by the system or the user may specify custom events, as shown in FIG. 4 and described below. The events may be specified in terms of features (or characteristics) of the video feed. These features may be image features (e.g. a particular breaking news logo used by a broadcaster may be used to identify a breaking news event), audio features (e.g. a particular theme tune or jingle may be used to identify a particular program) or temporal features (e.g. a slow motion replay may be used to identify when a goal is scored); however, the particular characteristics used may depend upon the particular event and the analysis technique used (in block 202) to detect the event, and this is described in more detail below.

FIG. 4 shows a flow diagram of an example method by which a user specifies an event to detect in terms of an image pattern. This image pattern may be referred to as a template image or target pattern. This method is an example implementation of block 302 of FIG. 3. A video clip is displayed to a user (block 401) by the event notification system and the user is able to freeze a frame (or scene) which has a particular required pattern (block 402). Having frozen the frame (in block 402), the system enables a user to highlight the part of the frame which is the pattern of interest, e.g. by drawing a bounding box around the required part of the frozen image (block 403). This selected pattern is then stored in memory with an associated event ID (block 405) and constitutes a target pattern. The analysis (e.g. in block 202) searches all of the captured frames for this target pattern. In some examples, a user may be provided with an advanced mode (block 404) to enable them to specify a portion of the space (i.e. a part of the frame or screen area) or a particular position in a frame where the event detection module should search for the identified pattern. In addition, or instead, the advanced mode (block 404) may enable a user to adjust parameters used in performing the event detection, such as a threshold of matching (as described below). A user may also be able to select a matching method for using in detecting the identified target pattern.

The analysis (in block 202) may use pattern matching, a statistical classifier or any other video, image or audio analysis technique. Features of the video feed which may be used include image features, audio features and temporal features (i.e. the changes in audio/video with time). Where pattern matching is used, the events may be specified in terms of a target pattern which may be an image pattern (e.g. a logo), an audio pattern (e.g. a theme tune) or a temporal pattern (e.g. a measure of change between adjacent captured frames). The analysis looks at portions of the live video feed to determine if the target pattern occurs. Where a statistical classifier is used, the classifier may previously have been trained to analyze images using a training set and the events may be specified in terms of characteristics which can be identified by the classifier. In an example, the system may be trainable through feedback from user to the system. Once an event is detected user may be able to specify whether it is a true alarm or not, and this can retrain the system metadata, and therefore improve the precision of the system. Depending on the variability of the target pattern or other characteristics which are used to define an event, different analysis techniques may be more suitable, e.g. where there is low variability in how the target pattern is actually presented, pattern matching may be suitable and where there is a higher variability in the manner in which the target pattern is used, use of a classifier may be more appropriate. The analysis is described in more detail below.

The matching method used for a particular event may be selected by a user (e.g. in the advanced mode of block 404) or may be selected automatically based on the event type, the characteristics of the video feed that define the event or on other factors. In some examples, a look-up table of event detection methods may be provided.

Figure 5:
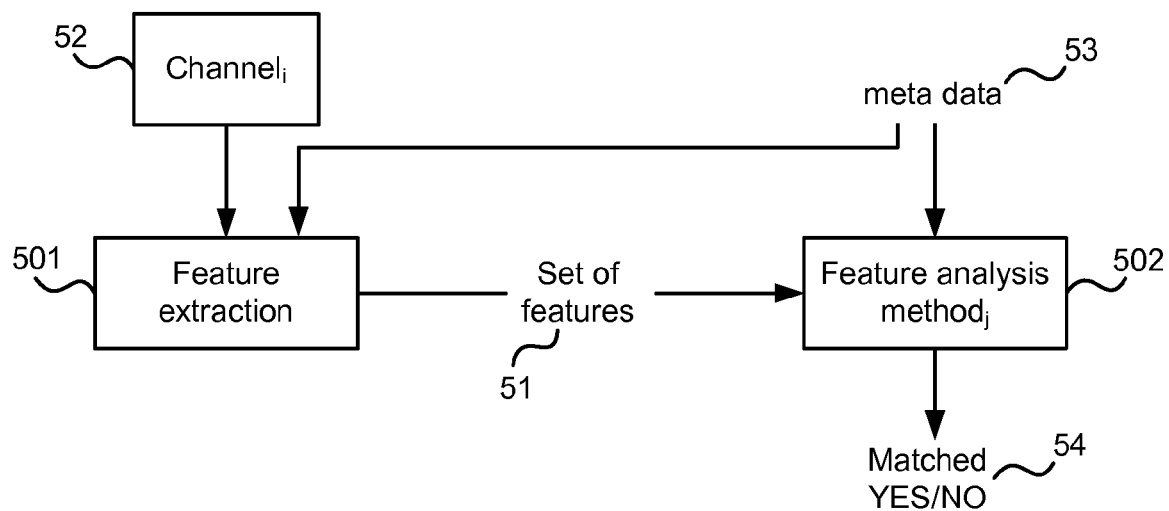
FIG. 5 is a schematic diagram showing an example of an event detection module in more detail.

FIG. 5 is a schematic diagram showing an example of the event detection module 101 in more detail. The module comprises two main components: a feature extraction module 501 and a feature analysis module 502. The feature extraction module 501 extracts a set of features 51 from a particular channel 52, where the features extracted may be dependent upon the monitored event (as specified in the metadata 53 associated with the event). The feature analysis module 502 analyzes the extracted features 51 based on the event metadata 53 and outputs a binary value 54 denoting the occurrence or absence of the monitored event on the particular channel 52. In an example, the feature analysis module 502 may perform pattern matching and in such an example the set of features 51 may comprise groups of pixels in a captured frame of video which are compared to a stored target pattern, e.g. by computing the Euclidian distance between pixels in the captured frame and the stored target pattern.

The metadata 53 may comprise the template pattern (also referred to as a target image/pattern) and, where specified, its target location in a frame. In other examples it may comprise any type of features, such as audio features, temporal features etc.

As described above, the target image pattern may comprise a logo, such as a breaking news logo which may be used by a broadcaster. In other examples, the target image pattern may comprise the title sequence (or a part thereof) for a television program. Further examples include the traffic lights used at the start of a Formula One race, a soccer team logo, etc.

The target image pattern may comprise a single pattern or may comprise a sequence of patterns. For example, a sequence of three patterns may be specified in relation to an event and a notification may only be triggered when the three patterns are detected in the correct order and within a defined number of frames (or within a defined time period). Using the Formula One example, the sequence of patterns may comprise the traffic light sequence used to indicate the start of the race. A notification may be triggered when the correct sequence is detected within a period of, for example, one minute. Detection of sequences of patterns may be used to detect other events, such as goal scoring or the dismissal of a player. In the example of detecting player dismissal the detection sequence may be as follow: foul detection, detection of a red card, detection of a close up on player's face (e.g. while going out) and possibly detection that crowd noise level is high.

In another example, the extracted features 51 may comprise an audio sequence which is compared against a stored target audio pattern. The target audio pattern may, for example, comprise a theme tune, jingle or other distinguishable sound. In an example, for detection of events in a video feed of a sporting event, the target audio pattern may be the sound of a whistle (e.g. a referees whistle) or horn/hooter which may be used to signify the start/end of play and/or the scoring of a goal. In another example, the target audio pattern may be the sound of the starting pistol (e.g. in athletics or horse racing). In another example, the target audio pattern may be defined in terms of a dynamic (or volume) or other characteristic of the audio signal. This may, for example, be used to detect a loud cheer in the audio accompanying a sporting event and may be used to detect goals or other significant events.

In a further example, temporal characteristics of the video may be used to identify an event. For example, the rate of change of the image between frames may be analyzed and used to identify when a slow motion action replay is being shown (e.g. following the scoring of a goal or other significant event in a sporting event).

Whilst the above description refers to the use of audio, image or temporal characteristics, in other examples, a combination of characteristics may be used to define the notification trigger for an event. In an example, the notification may be triggered by a change in score in a sporting event (e.g. a football match). This change in score may be detected by the analysis by determining the area of the frame where the score is displayed (e.g. by identifying the area of the frame which remains static between frames) and then detecting a change in the image in that area. In another example, a user or third party may define the area of the frame where the score is displayed.

Figure 6:
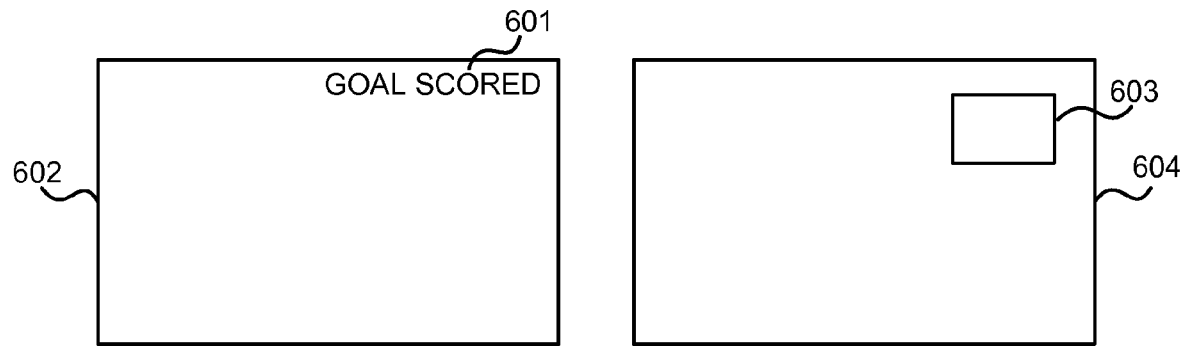
FIG. 6 shows schematic diagrams of two on-screen notification techniques.

The notification 13 may be sent to a user and/or to another entity (e.g. to a television, computer or recording device) and the notification may be sent (in block 204) using any suitable technology, including, but not limited to SMS messages, MMS (Multimedia Message Service) messages, email, instant messenger (IM), RSS or by any suitable signaling technology between entities. For the purposes of this description, a notification 13 is considered as being 'sent to a user' if it is a message which is sent to a user device to be read (e.g. in the form of an email, SMS or IM message) or otherwise interpreted by a user (e.g. where the notification causes the television to change channels to display the detected event).

Where the notification comprises a message which is read by a user, the message may include information about the event which has been detected. This information about the event may, for example, include a video or audio clip and/or details of the television channel on which the event was detected. In another example, the notification may be sent to a television and displayed to the user using text 601 on the screen 602 (ToS) overlaying the channel currently being watched or using picture 603 in picture 604 (PIP) technology, as shown in FIG. 6. Where text 601 is used, this may, for example, show the name or type of the event and/or the channel on which this event was detected.

In addition to, or instead of, sending a notification to a user, the notification may be sent to an entity to cause an action by that entity which may not be immediately apparent to the user, e.g. the notification may cause a video recording device (e.g. a VCR, DVD or hard drive recorder or a PC running suitable software) to start to record the video feed or to record a short video clip. Where the notification triggers the recording of a short video clip, this clip may then be included in a notification message which is sent to the user (e.g. by email or MMS message). A second notification may send another trigger to a video recording device to trigger the recording of the video feed to stop. In such an example, the event which is detected may be the end title sequence of the program (or part thereof).

The use of event detection to trigger recording of a video feed enables programs or other events to be recorded where there is no electronic program guide (EPG), where the event is not included in an EPG (e.g. breaking news) or where the EPG is not correct, e.g. where sporting events overrun causing subsequent programs to start and end late.

Different notifications may be used for different events, and/or the notification used may be dependent on whether the television (or other device used to watch the video feed) is switched on (e.g. PIP or ToS if the television is on or email or SMS if it is not). In some examples, a user may be able to specify the type of notification required for all events associated with the user or the notification required for a particular event (block 303 of FIG. 3). Where this occurs, the type of notification required, and/or user details to enable the notification to occur (such as an email address or mobile telephone number) may be stored (in block 304) in metadata associated with a particular event.

Figure 7:
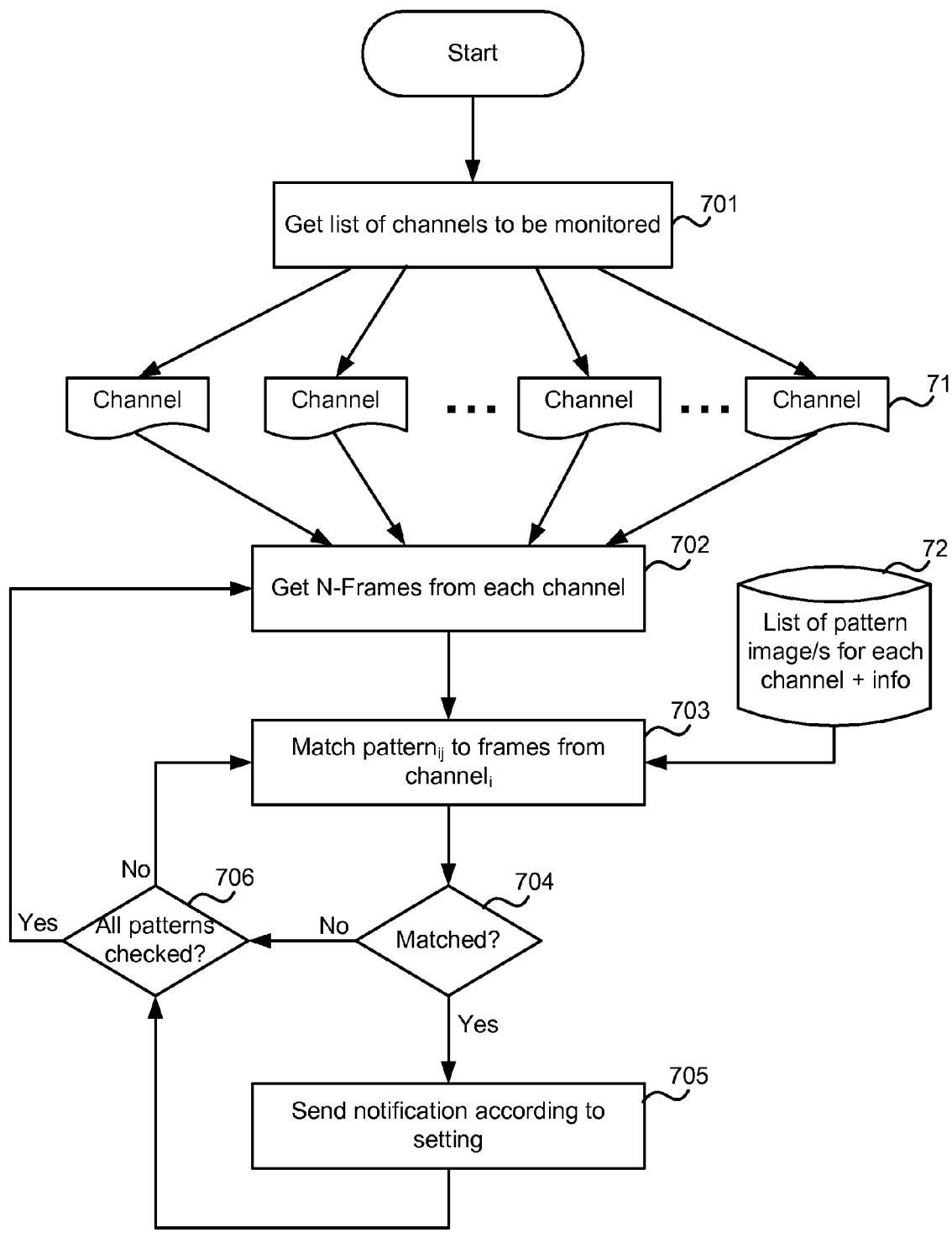
FIG. 7 is a flow diagram of another example method of event notification.

FIG. 7 is a flow diagram of another example method of event notification which uses pattern matching to detect events in one or more broadcast television channels 71. A list of channels to be monitored is accessed (block 701) and a number of frames, N, are captured from each channel 71 (block 702). The list of channels may be fixed or may have been specified by a user (e.g. in block 301 of FIG. 3) or other party (e.g. the broadcaster, a service provider etc). An image based pattern matching algorithm is then applied to each of the N frames (in block 703) to test for the occurrence of a specific pattern 72 for one channel. Each pattern image stored 72 relates to a particular event and may be associated with and checked against one or more channels. An example implementation of this pattern matching algorithm is described in more detail below with reference to FIG. 8. If the pattern matching indicates a match ('Yes' in block 704), a notification is sent (block 705) according to the settings for the particular matched event (e.g. as specified in metadata associated with the event and which may have been specified by a user, e.g. in block 303 of FIG. 3). The process is repeated for each pattern (as determined in block 706) and for each channel.

Figure 8:
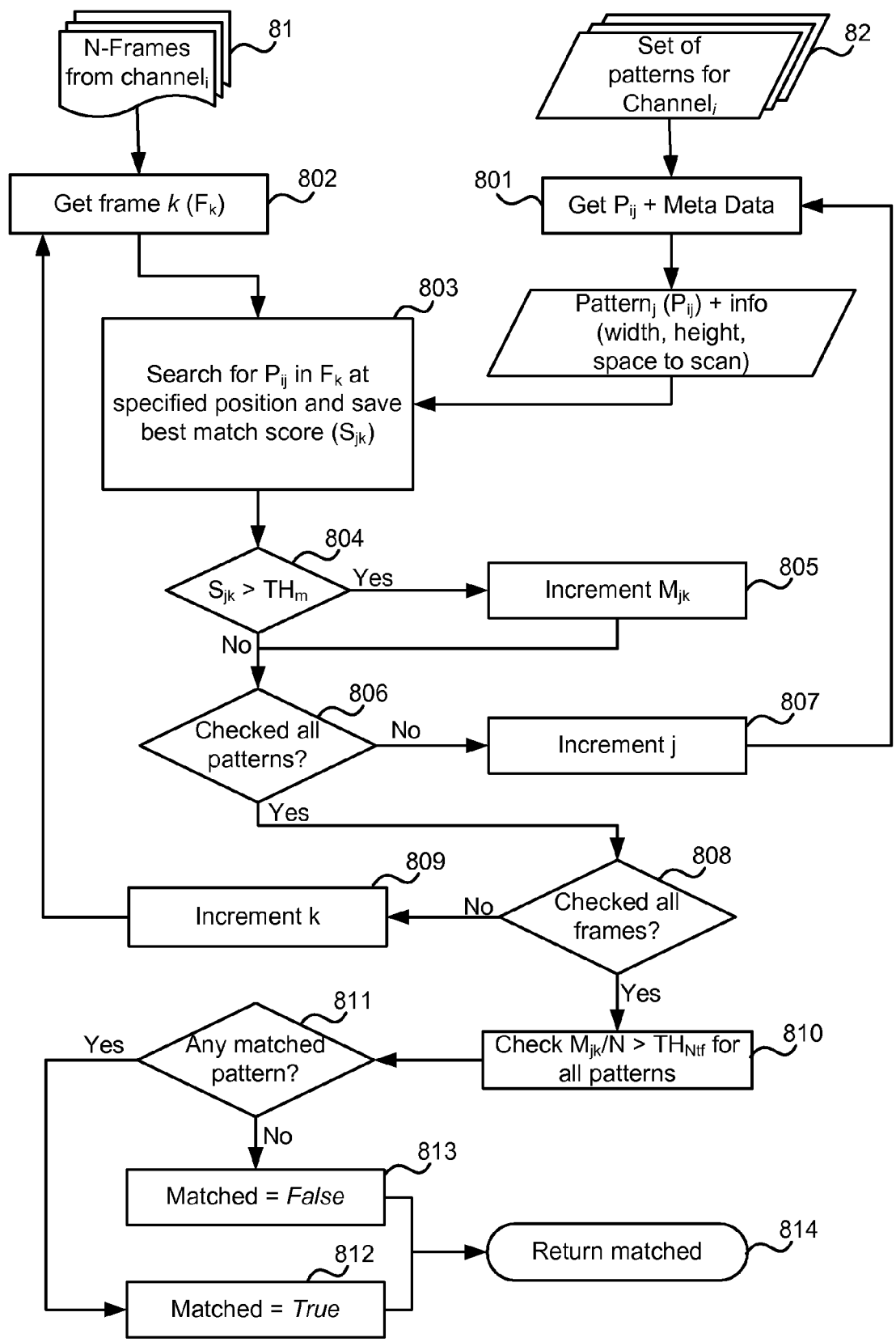
FIG. 8 shows an example implementation of a pattern matching algorithm.

FIG. 8 shows an example implementation of a pattern matching algorithm (blocks 703, 704, 706) in more detail for a single channel i. As shown in FIG. 7, the pattern matching algorithm may be repeated for different channels. N frames for each channel are checked every $T_c$ seconds for the occurrence of the specific pattern, where $T_c$ is the frame sampling period for a channel, and where $T_c$ satisfies:

$$T_c > N \cdot n \cdot T_{p|max}$$

where N is the number of frames to be checked for each channel, n is the total number of channels to be monitored and $T_{p|max}$ is the maximum processing time needed to scan one frame for a pattern. This condition ensures that the video feed can be processed in real-time.

The condition specified above sets a maximum number of channels which can be analyzed every frame which is limited by the processing time for a single frame ($T_{p|max}$) and this in turn is dependent upon a number of factors, such as the available processing power, the matching method used, the target pattern, the search area within a frame etc. In some examples, not every frame may be analyzed, either in order to satisfy the condition above or for other reasons (e.g. to reduce the processing power required). In an example, the condition above may enable every frame from 100 television channels (or 100 live video feeds) to be analyzed or every $10^{th}$ frame from 1000 television channels. It will be appreciated that any reference to a 'channel' may refer to a television channel or to a separate live video feed which may come from any source.

The inputs to the pattern matching algorithm are N frames 81 from channel i and a set of patterns 82 associated with channel i. Each of the patterns associated with channel i corresponds to an event and each event has associated metadata. A first pattern j for channel i, denoted $P_{ij}$, and the metadata associated with the corresponding event is accessed (block 801) and a first frame, $F_k$, from the N frames captured on channel i is also accessed (block 802). The frame is then searched for the pattern, $P_{ij}$ (block 803) and a best match score, $S_{jk}$ between the frame and the pattern is generated. Where the metadata specifies a position in the frame where the pattern $P_{ij}$ should occur (e.g. as specified by a user in block 404) the search may be limited to this position. If the best match score $S_{jk}$ exceeds a matching threshold, $TH_M$ (as determined in block 804), this is considered a 'hit' and a value $M_{jk}$ is incremented (block 805). This value $M_{jk}$ is the total number of hits that have occurred, i.e. it is the number of frames, out of the total of N frames from channel i, that include a target pattern j. This process is repeated (blocks 806, 807, 801, 803-805) for each of the other target patterns in the set of patterns 82 for channel i and is also repeated for each of the remainder of the N frames (blocks 808, 809, 801-807). Although FIG. 8 shows a particular order for the iteration, it will be appreciated that this is just one example and the iteration may alternatively occur in a different manner, whilst still iterating through all N frames and all target patterns (and where there are multiple channels i, through all channels).

Having checked all frames for all patterns ('Yes' in blocks 806 and 808), the number of frames $M_{jk}$ (out of the N frames analyzed) in which each pattern occurred is compared to a notification threshold, $TH_{Ntf}$. In the example shown in FIG. 8 (block 810), a match is considered to have occurred if the proportion of frames that the pattern occurred in ($M_{jk}/N$) exceeds the notification threshold (i.e. if $M_{jk}/N>TH_{Ntf}$), e.g. $TH_{Ntf}$=50%. For each pattern where a match is considered to have occurred ('Yes' in block 811), the value of a parameter 'Matched' is set to 'True' (block 812), and for each pattern where there the threshold was not exceeded (in block 810) and therefore a match has not occurred ('No' in block 811), the value of 'Matched' is set to 'False' (block 813). The value of 'Matched' for each pattern (or event) is then returned (block 814).

As described above, a user may be able to adjust the value of the notification threshold, $TH_{Ntf}$ (e.g. in block 404 of FIG. 4). For example, where a user receives too many notifications, a user may increase the value of the threshold and where a user is not receiving sufficient notifications (e.g. events may be being missed), the value of the threshold may be decreased by the user.

In some examples, only one frame may be analyzed in each sampling period (i.e. N=1). In such an example, the number of frames in which a pattern occurs, $M_{jk}$, has a binary value (i.e. 0 and 1). In such an example, a notification threshold may not be used and the flow diagram of FIG. 8 may be modified such that 'Matched=True' is returned if the best match score $S_{jk}$ exceeds a matching threshold, $TH_M$ ('Yes' in block 804 feeds to blocks 812, 814 and then 806 and 'No' in block 804 feeds to block 813 and then 806).

Figure 9:
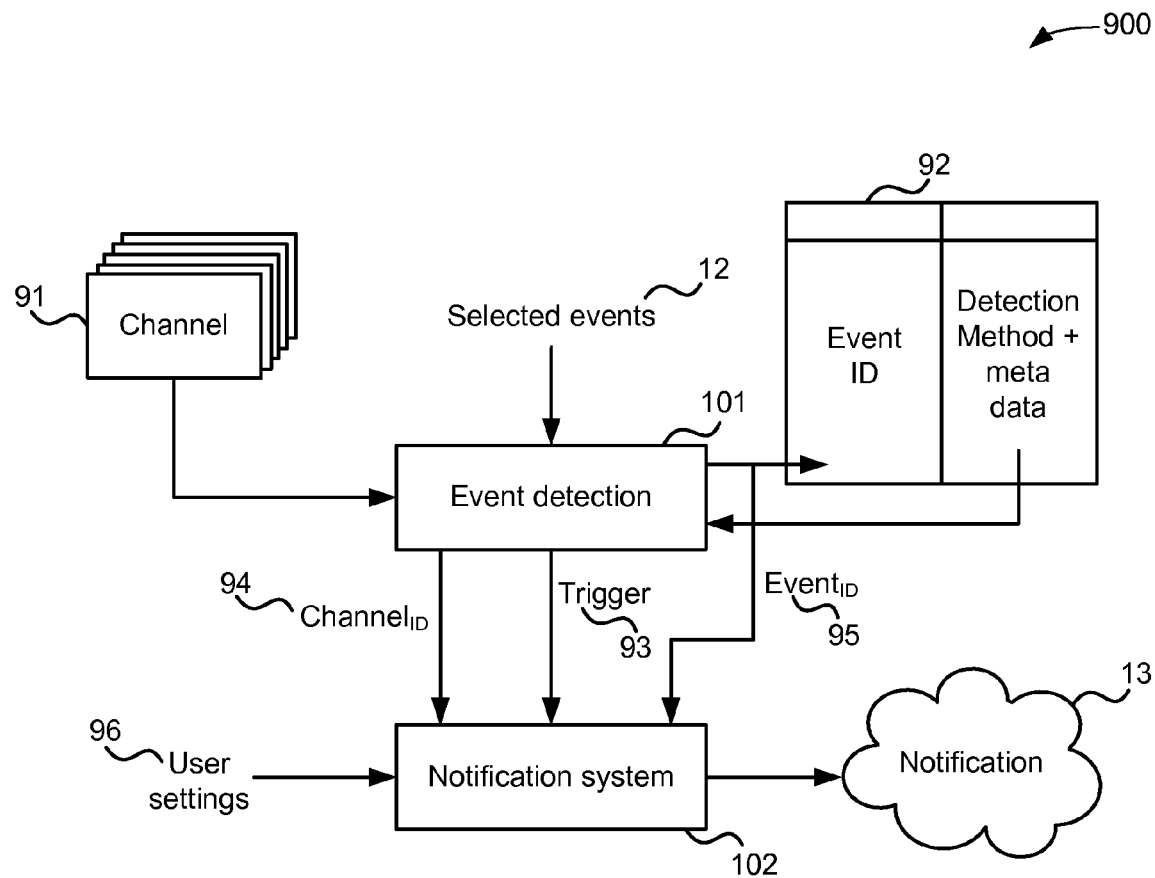
FIG. 9 is a schematic diagram of the automated event notification system in more detail.

FIG. 9 is a schematic diagram of the automated event notification system in more detail, the system 900 comprises an event detection module 101 and a notification system 102. The event detection module 101 receives details of selected events 12 and a live video feed which comprises a number of broadcast television channels 91. The event detection module 101 detects events using data 92 stored about each of the selected events 12. This data 92 may comprise details of a detection method (e.g. a matching method or algorithm) which should be used to detect the event and details of the features of the video feed which are to be used in detection. These features may be specified in metadata associated with the identifier (ID) of the particular event. This data 92 may, therefore, specify different detection methods for different events. When the event detection module 101 detects an event, it sends a trigger message 93 to the notification module 102 and this trigger message may include an identifier 94 for the channel on which the event has been detected and the event ID 95. On receipt of such a trigger message 93, the notification system 102 sends a notification 13, where the notification which is sent depends on user settings 96.

Figure 10:
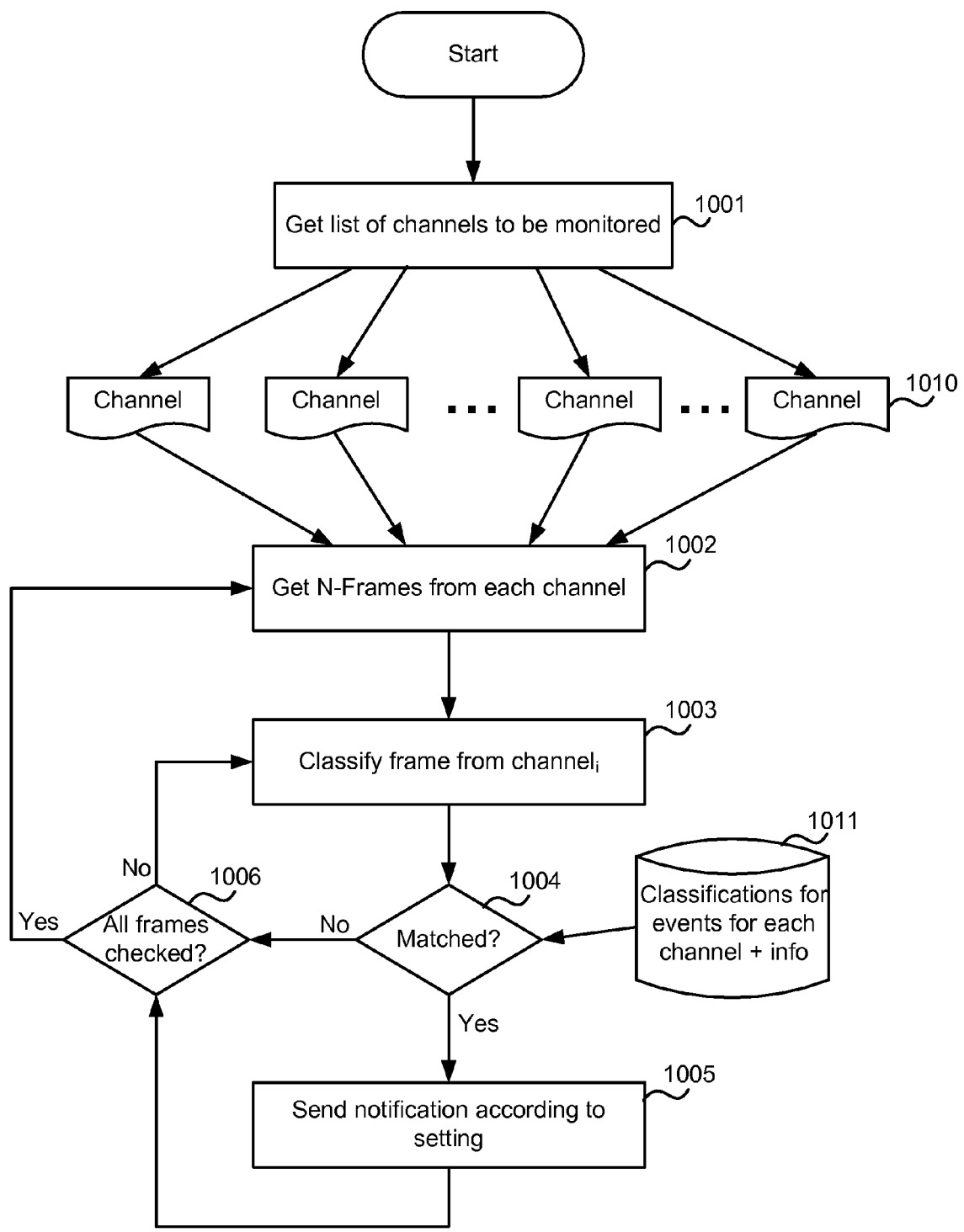
FIG. 10 is a flow diagram of a further example method of event notification.

FIG. 10 is a flow diagram of another example method of event notification which uses a classifier to detect events in one or more broadcast television channels 1010. As described above, the classifier may have been previously trained on a training set of video feeds or frames from video feeds. A list of channels to be monitored is accessed (block 1001) and a number of frames, N, are captured from each channel 1010 (block 1002). The list of channels may be fixed or may have been specified by a user (e.g. in block 301 of FIG. 3) or other party (e.g. the broadcaster, a service provider etc). A classifier is then used to classify a frame (in block 1003). Each event for which notification is required has an associated classification 1011 and other information, such as details on notification methods that should be used. If the classification of a frame matches the classification associated with an event ('Yes' in block 1004), a notification is sent (block 1005) according to the settings for the particular matched event (e.g. as specified in metadata associated with the event and which may have been specified by a user, e.g. in block 303 of FIG. 3). The process is repeated for each frame (as determined in block 1006) and for each channel.

The description herein refers to a user watching the live video feed on a television. This is by way of example and a user may watch a live video feed (e.g. a broadcast television channel or a downloaded video stream) on many different types of user device, including but not limited to, a computer, a mobile telephone, a handheld device (e.g. a personal digital assistant (PDA)), a games console, a media player (e.g. an MP3 or MP4 player) etc.

Figure 11:
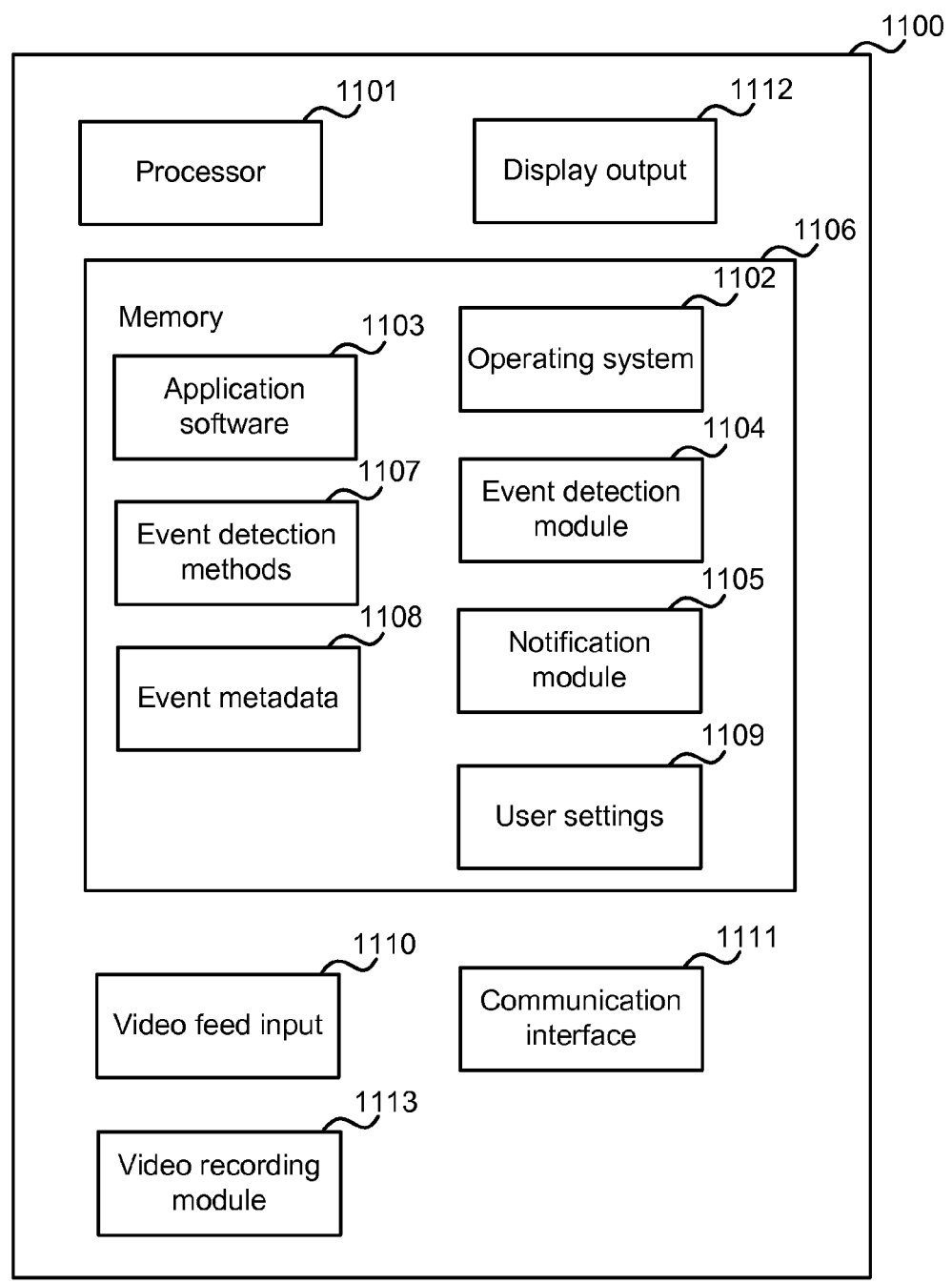
FIG. 11 illustrates an exemplary computing-based device in which embodiments of the methods described herein may be implemented.

FIG. 11 illustrates various components of an exemplary computing-based device 1100 which may be implemented as any form of a computing and/or electronic device, and in which embodiments of the automated notification methods described herein may be implemented.

Computing-based device 1100 comprises one or more processors 1101 which may be microprocessors, controllers or any other suitable type of processors for processing computing executable instructions to control the operation of the device in order to perform event detection and/or notification. Platform software comprising an operating system 1102 or any other suitable platform software may be provided at the computing-based device to enable application software 1103-1105 to be executed on the device.

The application software comprises an event detection module 1104 and a notification module 1105. As described above, the event detection module 1104 may comprise a feature extraction element and a feature analysis module (as shown in FIG. 5 and described above).

The computer executable instructions may be provided using any computer-readable media, such as memory 1106. The memory is of any suitable type such as random access memory (RAM), a disk storage device of any type such as a magnetic or optical storage device, a hard disk drive, or a CD, DVD or other disc drive. Flash memory, EPROM or EEPROM may also be used. The memory may also be used to store a table of event detection methods 1107, which may be used by the event detection module 1105, metadata 1108 associated with each event and user settings 1109. The table of event detection methods 1107 may be upgradeable such that additional event detection methods can be introduced and used for detecting events.

The computing-based device 1100 also comprises an input 1110 for receiving the video feed and may also comprise one or more additional inputs which are of any suitable type for receiving other media content, Internet Protocol (IP) input, etc. The device may also comprise a communication interface 1111 which may be used by the notification module 1105 to send messages to a user (e.g. email or SMS messages).

An output 1112 may also be provided such as a video output (or other display output) to a display system integral with or in communication with the computing-based device. In an example, this video output may be an output to a television or to a computer monitor in order to display the video feed. This output may be used by the notification module 1105 to provide on screen messages to a user (e.g. using PIP or ToS). The computing-based device 1100 may also comprise a video recording module 1113 which may be a peripheral device or an application software module.

The computing-based device 1100 may, for example, be a television, a television tuner, a set-top box, a video recording device, a games console, a PC running multimedia center software etc. In another example, the computing-based device 1100 may comprise a web server and the event notification methods described above may be offered to users as a web service. In such an example, the server may not comprise an output 1112 to a display system.

Figure 12:
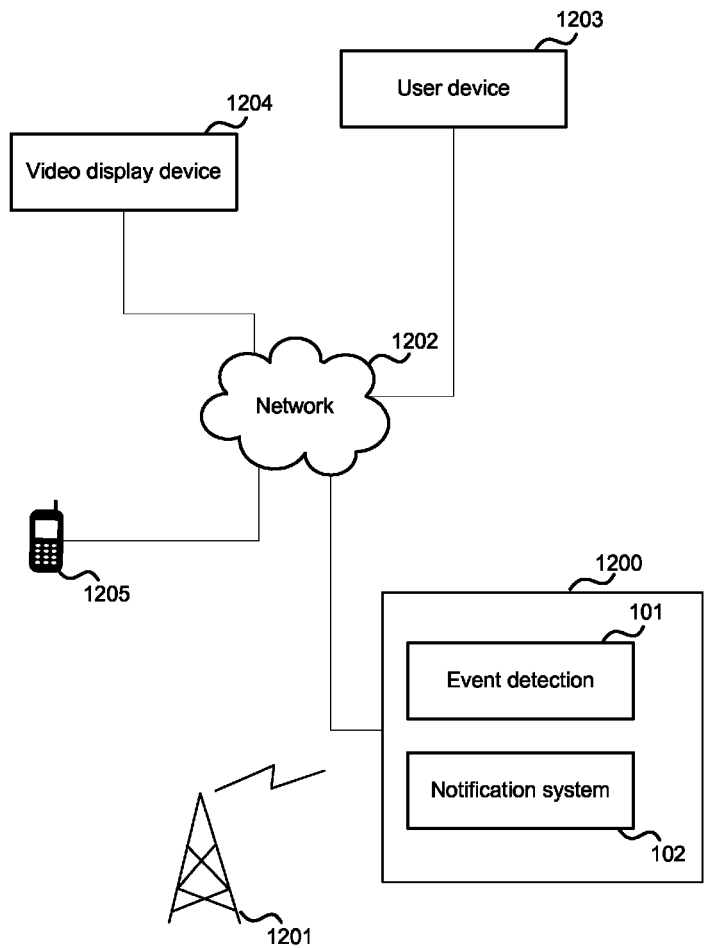
FIG. 12 is a schematic diagram of another automated event notification system.

FIG. 12 is a schematic diagram of another automated event notification system 1200 which comprises an event detection module 101 and a notification system 102. The event notification system 1200 is connected to a network 1202, which may be the internet. The event notification system 1200 may receive a broadcast video feed (e.g. broadcast television) from a transmitter 1201 or alternatively it may receive the video feed from the network 1202. A user may use a user device 1203 to configure the events for which notification is required (e.g. as shown in FIGS. 3 and 4) and may interface with the event notification system 1200 using a custom interface or a standard web browser. Notifications may be provided by the system 1200 to the user device 1203 (e.g. by email), to the video display device 1204 associated with the user (e.g. using PIP or ToS), to a mobile device 1205 associated with the user (e.g. using SMS or MMS messages) or to another device (not shown in FIG. 12). It will be appreciated that in some examples, the user device 1203 and the video display device 1203 may be the same device.

Where the event notification system is remote from the user's video display device, e.g. as shown in FIG. 12, the system may be operated by a third party (e.g. a broadcaster, internet service provider, communications/television service provider etc) for multiple users. This may enable analysis to be performed on frames to detect events for more than one user which may be more efficient than performing the analysis separately for each user. Furthermore, additional processing power may be available in such a configuration compared to the situation where the analysis is performed within a consumer device (e.g. a television or set-top box).

Whilst the above description and FIGS. show the event detection module 101 and notification system 102 being co-located, in other examples, the two modules may be located in different places or within different devices and the modules may communicate over a network or other communications link. For example, the event detection module may be located within a consumer device and the notification module may be located within a network, e.g. within the cellular telephone network.

There are many different applications for the methods and apparatus described herein. The examples above relate to analysis of broadcast television channels to detect user specified events. In other examples, the methods may be used to monitor channels being watched by a child to detect inappropriate content or an inappropriate program and notify a parent or guardian when this inappropriate content/program is detected. In an example this may use a classifier to detect adult material or may use a pattern matching algorithm to detect a film classification logo (e.g. that indicates the minimum age for which the content is suitable). The methods may also be used to monitor web use by a minor, e.g. to detect unsuitable content in a video streamed from a video sharing site.

Embodiments of the systems and methods described above provide an automated personalized notification system for events in a live video feed. The video feed, which need not only comprise live content, is analyzed in real-time and notifications can be provided to the user according to user settings. Notifications may be provided to a user whether they are watching the live video feed or not and in some cases, different notification methods may be used depending on this.

The methods may be considered to operate a 'pull' model, where the user specifies the events that they consider interesting and for which they require notification. This contrasts to a 'push' model where the broadcaster (or other provider of the video feed) determines the events that are considered interesting and notifies the users.

Embodiments of the system are fully configurable by the user. Aspects that may be configured include one or more of: the events, the analysis method, the notification threshold and the notification method.

Although the present examples are described and illustrated herein as being implemented in a system which receives and analyzes video feeds, such as broadcast television channels, the system described is provided as an example and not a limitation. As those skilled in the art will appreciate, the present examples are suitable for application in a variety of different types of systems which are capable of receiving any form of media feed, where a media feed may comprise a video feed, an audio feed (e.g. streamed radio channels), an audiovisual feed or a multimedia feed.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Some of the FIGS. described above include arrows between elements in a system. Although the arrows may be shown as unidirectional, this is by way of example only and the data flow between elements may be unidirectional in either direction or may be bidirectional.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of personalized event notification comprising:
   each act performed by one or more processors executing computer-readable instructions,
   receiving a live media feed, wherein the live media feed comprises a media feed that is not processed between transmission from a broadcaster and receipt by the one or more processors;
   analyzing the live media feed in real-time to detect a user specified event, the analyzing comprising:
   classifying a portion of the live media feed via a statistical classifier trained using feedback from a user;
   determining what portion of the live media feed to classify based at least in part on the number of channels of media being classified;
   determining if the classified portion of the live media feed matches a classification associated with the user specified event; and
   determining whether a crowd noise level in an audio portion of the media feed increases; and
   on detection of the user specified event, sending a notification message, wherein the detected user specified event is not identified by metadata.

2. A method according to claim 1, wherein analyzing the live media feed in real-time to detect a user specified event comprises:
   performing pattern matching to determine if a second portion of the live media feed matches a target pattern associated with the user specified event.

3. A method according to claim 2, wherein the target pattern comprises at least one of an audio pattern and an image pattern.

4. A method according to claim 2, wherein the live media feed comprises a video feed and target pattern comprises a measure of change between frames in the second portion of the video feed.

5. A method according to claim 2, wherein performing pattern matching to determine if a second portion of the live media feed matches a target pattern associated with the user specified event comprises:
   accessing the target pattern;
   comparing the target pattern and the second portion of the live media feed and saving a score indicating a level of correspondence between the target pattern and the second portion; and
   detecting the user specified event when the score exceeds a threshold.

6. A method according to claim 5, wherein comparing the target pattern and the second portion of the live media feed and saving a score indicating a level of correspondence between the target pattern and the second portion comprises:
   (i) searching a first frame in the second portion of the live media feed for the target pattern and saving a score indicating a level of correspondence between the target pattern and the first frame;
   (ii) if the score exceeds a first threshold, incrementing a match score; and
   repeating steps (i) and (ii) for each frame in the second portion of the live media feed, wherein detecting the user specified event when the score exceeds a threshold comprises:
   detecting the user specified event when the match score exceeds a second threshold.

7. A method according to claim 1, wherein sending a notification message comprises:
   sending a notification message to a user.

8. A method according to claim 1, wherein sending a notification message comprises:
   displaying a notification message on a video display device.

9. A method according to claim 1, further comprising:
   receiving a user input identifying the live media feed;
   receiving data from a user identifying the user specified event and a notification method associated with the user specified event; and
   storing the data.

10. A method according to claim 9, wherein receiving data from a user identifying the user specified event and a notification method associated with the user specified event comprises:
- displaying a video clip;
- enabling a user to freeze the video clip on a frame and select a portion of said frame; and
- saving the portion of said frame as a target pattern.

11. A method according to claim 1, wherein the live media feed comprises at least one broadcast television channel.

12. An automated event detection system comprising:
- one or more processors; and
- memory communicatively coupled to the one or more processors, the one or more processors configured to provide:
  - an event detection module, stored in the memory and executable on the one or more processors, to receive and analyze a live media feed in real-time to detect a user specified event that is not identified by metadata in the live media feed, the event detection module comprising a statistical classifier trained using feedback from a user to classify a portion of the live media feed, the event detection module being configured to determine what portion of the live media feed to classify based at least in part on the number of channels of live media feed being classified, the event detection module being configured to determine whether a crowd noise level in an audio portion of the live media feed increases; and
  - a notification module, stored in the memory and executable on the one or more processors, to send a notification on detection of the user specified event.

13. An automated event detection system according to claim 12, wherein the event detection module comprises a feature extraction module arranged to extract a set of features from a portion of the live media feed and a feature analysis module, stored in the memory and executable on the one or more processors, to detect the user specified event based on the set of features.

14. An automated event detection system according to claim 12, further comprising a communication interface and wherein the notification module sends a notification message to a user associated with the user specified event via the communication interface.

15. An automated event detection system according to claim 12, the one or more processors being further configured to provide a media recording module, stored in the memory and executable on the one or more processors, wherein the notification module sends the notification to the media recording module to trigger recording of the live media feed.

16. One or more tangible device-readable media with device-executable instructions for performing acts comprising:
- training a statistical classifier using feedback from a user to classify a portion of live media feed;
- analyzing, via the trained statistical classifier, a portion of the live media feed in real-time to determine if the portion of the live media feed includes the user specified event, wherein the analyzing comprises ignoring metadata, determining what portion of the live media feed to classify based at least in part on the number of channels of live media feed being classified, analyzing including determining whether a crowd noise level in an audio portion of the media feed increases; and
- if the portion of the media feed includes the user specified event, sending a notification to a user associated with the user specified event.

17. One or more tangible device-readable media according to claim 16, wherein the analyzing further comprises:
- capturing a frame from the media feed;
- matching the captured frame and a target pattern associated with the user specified event to produce a matching score; and
- determining if the matching score exceeds a threshold.

18. One or more tangible device-readable media according to claim 16 with device-executable instructions for performing acts further comprising:
- sending a triggering signal to a recording device when the portion of the media feed includes the user specified event, the triggering signal causing the recording device to record the media feed; and
- sending a recording of the media feed created by the recording device to the user.

19. One or more tangible device-readable media according to claim 16 with device-executable instructions for performing acts further comprising:
- determining whether more than one user has requested a notification for the user specified event; and
- sending the notification to all users who have requested the notification for the user specified event.

20. One or more tangible device-readable media according to claim 16, wherein sending a notification to a user associated with the user specified event further comprises:
- determining whether a device used to watch the media feed is turned on or off; and
- sending the notification to the user to an alternate device when the device used to watch the media feed is turned off.

* * * * *